United States Patent [19]

Riese

[11] 4,257,502

[45] Mar. 24, 1981

[54] DISK CLUTCH WITH TWO DRIVEN DISKS

[75] Inventor: Hans-Walter Riese, Schwebheim, Fed. Rep. of Germany

[73] Assignee: Fichtel & Sachs AG, Schweinfurt, Fed. Rep. of Germany

[21] Appl. No.: 958,876

[22] Filed: Nov. 8, 1978

[30] Foreign Application Priority Data

Nov. 17, 1977 [DE] Fed. Rep. of Germany ....... 2751357

[51] Int. Cl.³ .................... F16D 13/52; F16D 13/75
[52] U.S. Cl. .......................... 192/70.25; 192/111 A
[58] Field of Search ............. 192/70.25, 111 A, 48.1, 192/70.16, 70.11, 70.21; 188/71.5, 71.1, 218 XL

[56] References Cited

U.S. PATENT DOCUMENTS 4,191,285   3/1980   Thelander et al. ........... 192/70.25 X Primary Examiner—Rodney H. Bonck
Attorney, Agent, or Firm—Toren, McGeady and Stanger

[57] ABSTRACT

Uniform wear of the friction facings on the two driven disks of a friction clutch opposite an intermediate plate is favored by two-armed levers fulcrumed to equiangularly spaced, circumferential portions of the intermediate plate whose arms are hingedly fastened to the pressure plate and the clutch cover. When the pressure plate is moved axially relative to the clutch cover which rotates with the pressure plate, the axial stroke of the intermediate plate is a precisely defined fraction of the pressure plate stroke.

9 Claims, 5 Drawing Figures

DISK CLUTCH WITH TWO DRIVEN DISKS

This invention relates to friction clutches, and particularly to a friction clutch which includes two clutch disks, a pressure plate, an intermediate plate, and a clutch cover mounted for rotation about a common axis while axially movable relative to each other so that the pressure plate may be moved relative to the clutch cover in order to press the two disks and the interposed intermediate plate axially against each other and against the flywheel of an internal combustion engine and the like.

It is difficult in such a clutch to achieve simultaneous engagement of the friction facings on the clutch disks with cooperating faces of the intermediate plate, and simultaneous disengagement of the clutch disks from the intermediate plate. If the clutch disks are engaged and disengaged one after the other, some friction facings are consumed faster than others, and the useful life of the clutch between overhauling operations is reduced. Attempts at avoiding such uneven wear of friction facings by means of springs have had only moderate success.

It is the primary object of this invention to achieve uniform wear of friction facings in a multiple-disk clutch of the type described without reliance on springs.

With this object and others in view, the invention provides a multiple-disk friction clutch of the type described with several two-armed levers whose middle portions are secured to respective, circumferentially spaced portions of the intermediate plate for movement about respective pivot axes transverse to the common axis of rotation of the clutch disks, the intermediate plate, the pressure plate, and the clutch cover. The two arms of each lever are hingedly secured to the pressure plate and the clutch cover so that the axial movement of the intermediate plate relative to the clutch cover is a precisely defined fraction of the corresponding movement of the pressure plate during engagement and disengagement of the clutch.

According to another important feature of the invention, a friction device impedes translatory movement of each middle portion relative to the intermediate plate in the direction of the clutch axis while permitting shifting of the middle portion under a sufficient, axially applied force. The position of the intermediate plate is adjusted thereby for uneven wear of friction facings not directly cooperating with the intermediate plate.

Other features, additional objects, and many of the attendant advantages of this invention will readily be appreciated as the same becomes better understood by the following detailed description of preferred embodiments when considered in connection with the appended drawing in which.

Figure 1:
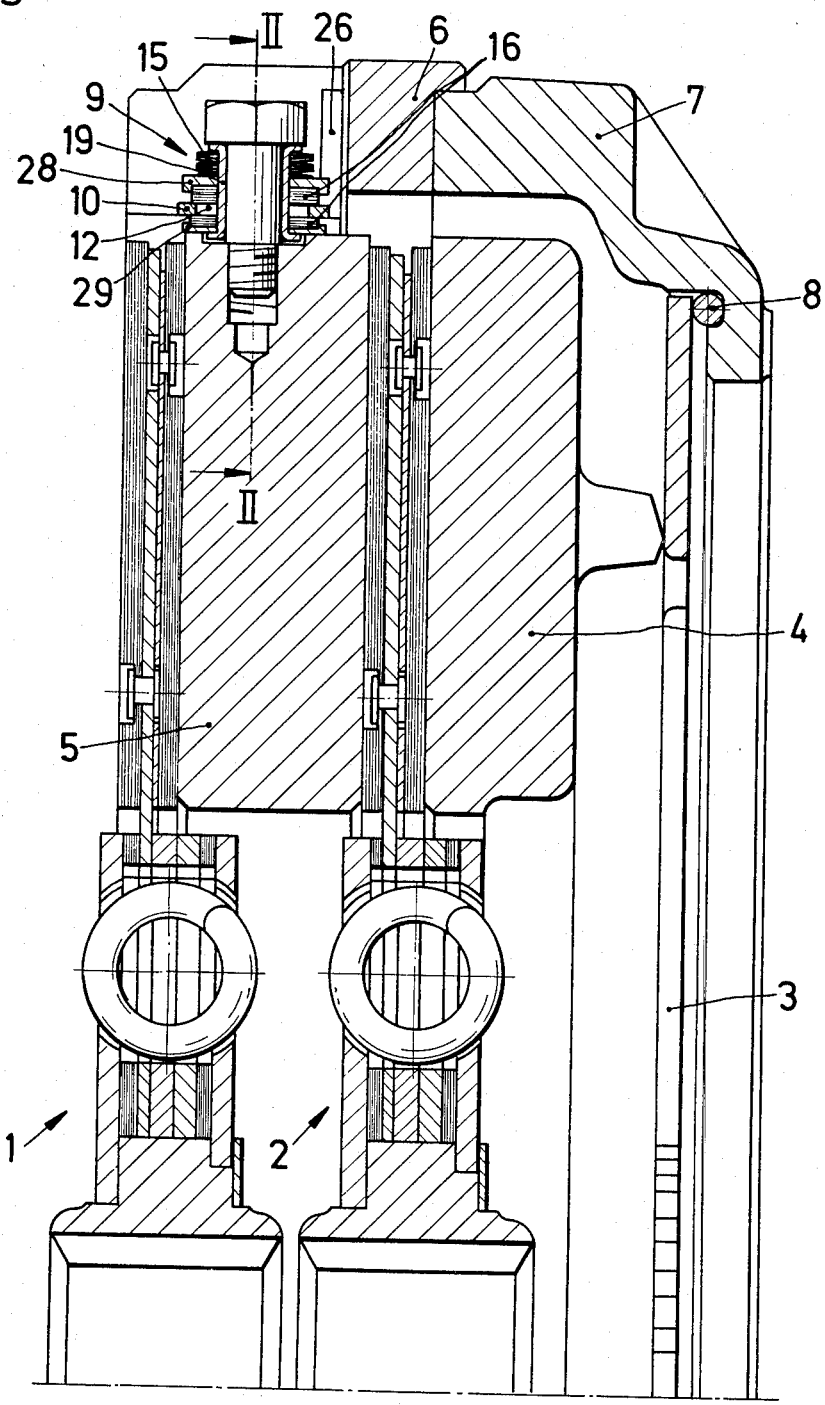
FIG. 1 shows one half of a friction clutch of the invention in side elevational section on the axis of rotation, the non-illustrated half of the clutch being a mirror image of the illustrated structure except as specifically stated otherwise hereinbelow.

Referring now to the drawing in detail, and initially to FIG. 1, there is shown only as much of the conventional features of the clutch of the invention as is needed for an understanding of the same. Two driven clutch disks 1, 2 are normally keyed to a non-illustrated clutch shaft so that they rotate jointly with the shaft, but may slide axially on the shaft. A diaphragm spring 3 biases a pressure plate 4 toward the left, as viewed in FIG. 1, and thus toward the non-illustrated flywheel of an internal combustion engine. The disk 2 is axially interposed between the pressure plate 4 and an intermediate plate 5, and the latter is axially interposed between the two disks 1, 2 whose radial faces carry riveted friction facings in the usual manner. The friction facing on the disk 1, which appears exposed in FIG. 1, is pressed by the spring 3 against the non-illustrated flywheel when the clutch is engaged. The illustrated structure described so far is arranged in a clutch cover consisting of a ring 6, axially co-extensive with the clutch disks 1, 2 and the intermediate plate 5, and an annular, dished portion 7 fixedly fastened to the ring 6 and enveloping the pressure plate 4 and spring 3. The cover 6, 7 is normally attached to the non-illustrated flywheel. The spring 3 abuttingly engages an outer pivot ring 8 on the cover portion 7. The release bearing and other elements which cause the spring 3 to engage and disengage the clutch by axially moving the pressure plate 4 relative to the clutch cover while the illustrated clutch elements rotate either with the clutch shaft or the flywheel or both are too well known to require illustration. The conventional elements which secure the intermediate plate 5 and pressure plate 4 to the cover 6, 7 for joint rotation also have been omitted from the drawing.

Figure 2:
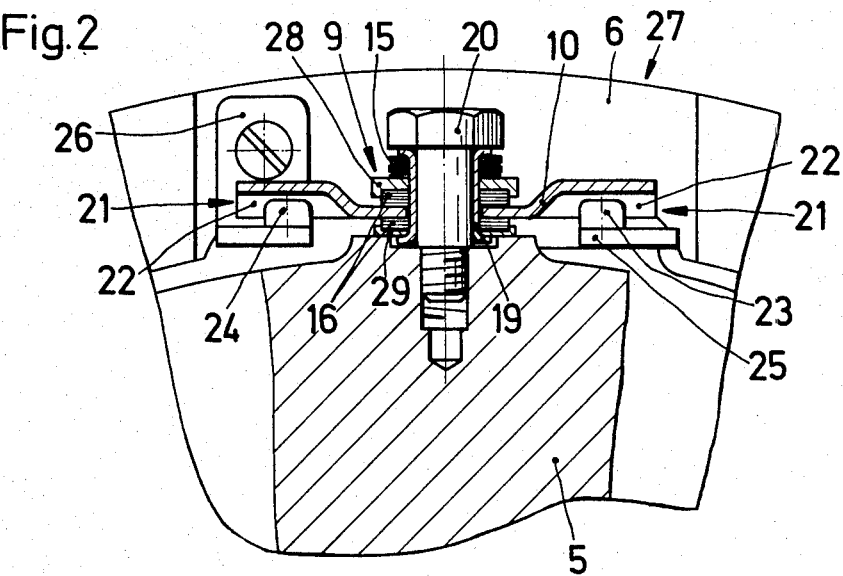
FIG. 2 is a fragmentary sectional front view of the clutch of FIG. 1 taken on the line II—II.
Figure 3:
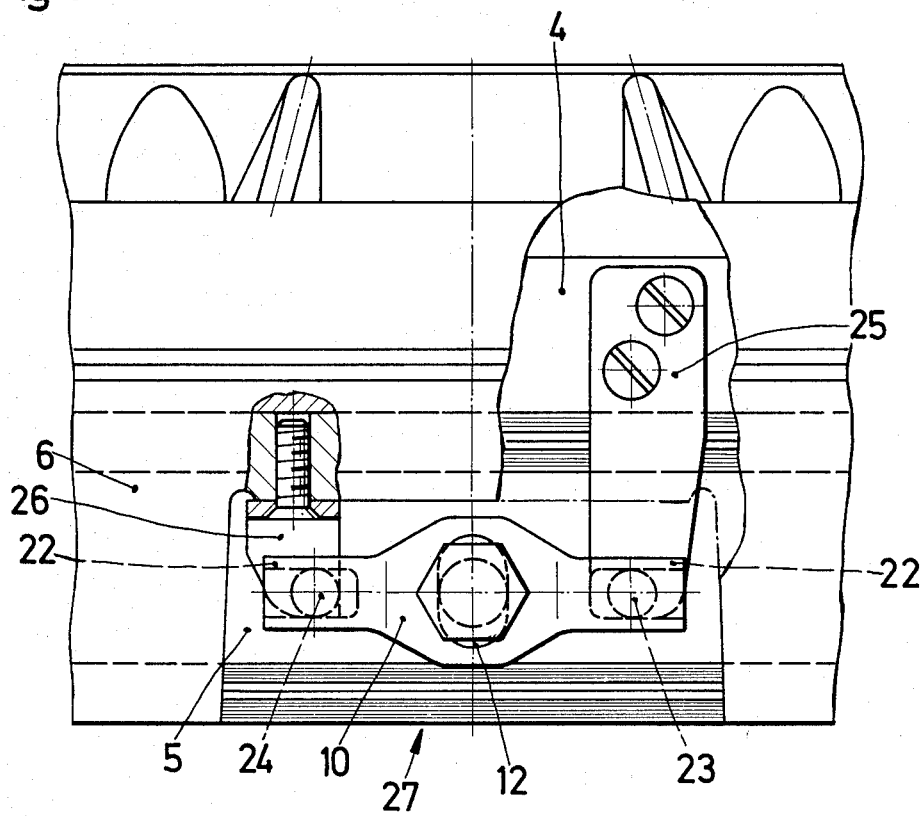
FIG. 3 illustrates the clutch portion of FIG. 2 in top plan view, portions of the clutch cover being broken away to reveal internal structure.

This invention is more specifically concerned with three identical positioning mechanisms 9 equiangularly spaced about the clutch axis, only one such mechanism being visible in FIG. 1 and being shown in different views in FIGS. 2 and 3.

A two-armed sheet-metal lever 10 is elongated at right angles to the plane of FIG. 1 and has a middle portion formed with a slot 12 elongated in the direction of the clutch axis. A shoulder screw 20 passes through the slot 12 into a threaded, radial bore in the circumferential face of the intermediate plate 5. A stack of annular belleville washers 15 and two annular friction disks 16 are mounted on the smoothly cylindrical portion of the screw 20 between the enlarged screw head and the surface of the plate 5 between radial flanges at the two axial ends of a sleeve 19 which freely rotates on the screw 20. The friction disks 16 receive the lever 10 therebetween and are backed by respective washers 28, 29 so that the friction disks 16 normally secure the screw 20 in a fixed position in the slot 12 while the lever 10 pivots freely on the screw 20 about a pivot axis which is at least approximately radial relative to the clutch axis.

Longitudinal grooves 21 open toward the clutch axis are bounded by depending flanges 22 on the two arms of the lever 10. Pins 23, 24 are received in the grooves 21 for radial movement relative to the pivot axis. They are fixedly mounted on the pressure plate 4 and the ring 6 respectively by means of brackets 25, 26, as is best seen in FIG. 3. Ready access to the lever 10 is had through a notch 27 in the ring 6 which is open in a circumferential and both radial directions so that the lever 10 may be installed after assembly of all other clutch elements. The mechanism 9 is partly received in the notch 27.

When the pressure plate is moved to the right from the engaged clutch position of FIG. 1 relative to the clutch cover 6, 7 by the non-illustrated clutch release bearing, the intermediate plate 5 is moved one half the axial distance traveled by the pressure plate 4 because the pivot axis of the screw 20 is centered between the pins 23, 24, and the disks 1, 2 are disengaged simultaneously from contact under axial pressure with the intermediate plate 5. The effective lengths of the two arms of the lever 10 are determined by the circumferential locations of the pins 23, 24 and are identical. However, an arm ratio different from 1:1 may be chosen for specific applications, and the term "middle" as applied to the lever portion secured to the intermediate plate 5 does not imply symmetry of the arms, but merely defines the fact that the middle portion is located between the arms.

If for any reason one of the driven clutch disks 1, 2 should engage the intermediate plate 5 earlier than the other, the applied axial force of the spring 3 overcomes the much weaker force of the friction disks 16 which hold the screw 20 in the illustrated position in the slot 12, and the screw 20 is shifted longitudinally of the slot as needed to ensure that the disks 1, 2 will simultaneously engage the intermediate plate 5 during the next cycle of clutch engagement, and will simultaneously release the plate 5 during clutch disengagement.

Figure 4:
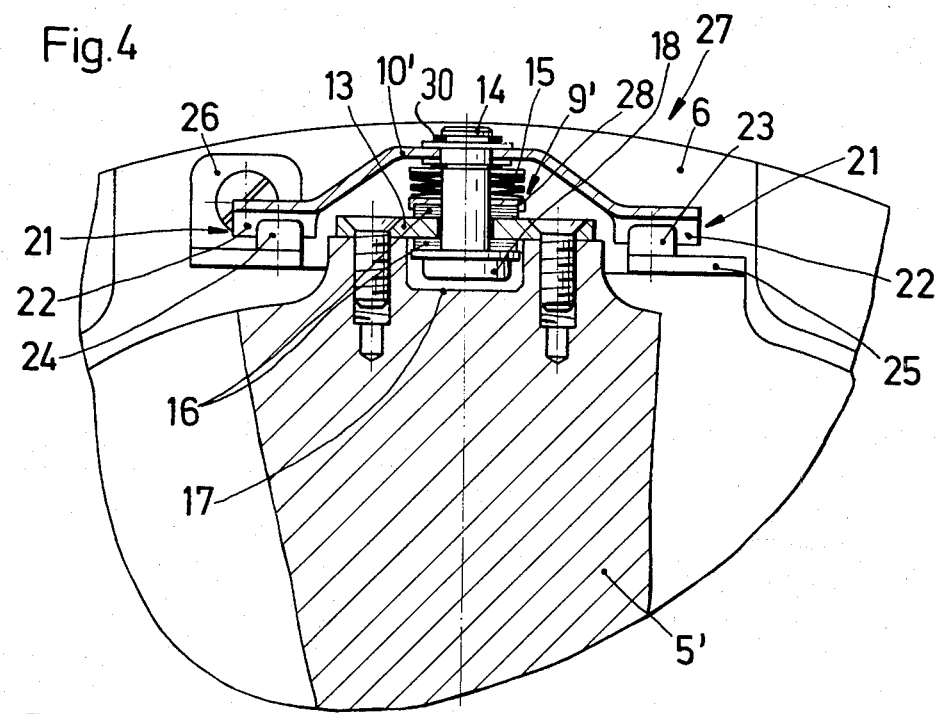
FIGS. 4 and 5 show a modified friction clutch of the invention in respective views corresponding to those of FIGS. 2 and 3.
Figure 5:
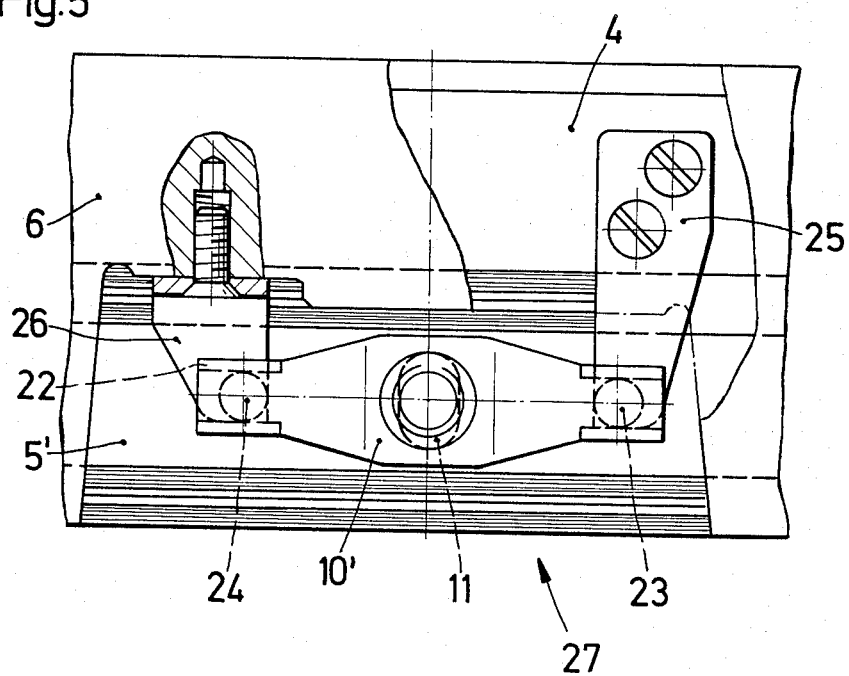

In the first-described embodiment of the invention, the screw 20 is shifted relative to the lever 10 to compensate for uneven wear of friction facings, but an analogous friction device may impede translatory movement in the direction of the clutch axis between a pivot member, analogous to the screw 20 and the circumferential portion of an intermediate plate as is shown in FIGS. 4 and 5 with reference to a clutch practically identical with that described above in most other respects.

The two-armed lever 10' of the modified positioning mechanism 9' has a circular opening receiving a pivot pin 14 with enough clearance to permit free angular movement of the lever and is axially secured on the pin 14 between spring clips 30 partly received in annular grooves of the pin. Flanges 22 on the two arms of the lever 10' bound grooves 21 in which pins 23, 24 are slidably received, the pins being mounted fixedly on the pressure plate 4 and the ring 6 by means of brackets 25, 26 as described above.

The intermediate plate 5' differs from the plate 5 by three equiangularly distributed recesses 17 in its circumferential face, each associated with a pivot pin 14 in the manner illustrated for one pin in FIGS. 4 and 5. The enlarged head 18 of the pin is received with ample clearance in the recess 17. The recess is covered by a guide plate 13 fixedly bolted to the plate 5' and formed with a slot 11 elongated in the direction of the clutch axis. Longitudinal movement of the pin 14 in the slot 11 is impeded by friction disks 16 and a stack of belleville washers 15, one friction disk 16 being mounted on the pin 14 between the head 18 and one face of the guide plate 13, the other disk 16 and the belleville washers 15 being compressed between the outer face of the guide plate 13 and one of the spring clips 30.

The positioning mechanism 9' normally functions in the same manner as the mechanism 9. When an axial force of an adequate magnitude is exerted on the pin 14 by the spring 3 during engagement of the clutch, the pin 14 slips in the slot 11.

An adjusting mechanism for an intermediate plate in which the pivot axis of the lever is radial or at least approximately radial relative to the clutch axis is preferred because it requires little space, but modifications of the illustrated devices will readily be devised in which the pivot axis of each lever has a predominant tangential component relative to the clutch axis.

It should be understood, therefore, that the foregoing disclosure relates only to presently preferred embodiments, and that it is intended to cover all changes and variations of the examples of the invention herein chosen for the purpose of the disclosure which do not constitute departures from the spirit and scope of the invention set forth in the appended claims.

What is claimed is:

1. In a clutch including two clutch disks, a pressure plate, an intermediate plate, and a clutch cover mounted for rotation about a common axis and movable relative to each other in the direction of the common axis, and operating means for moving said pressure plate relative to said clutch cover in the direction of the common axis, one of said clutch disks being interposed between said pressure plate and said intermediate plate, and said intermediate plate being interposed between said two clutch disks, the improvement which comprises:

(a) a plurality of two-armed levers each having a middle portion with a pair of arms with each arm extending outwardly from said middle portion on the opposite side thereof from said other arm said middle portions secured to angularly spaced apart portions on the circumferentially extending surface of said intermediate plate for movement about respective pivot axes extending approximately radially of said common axis and through said intermediate plate;

(b) first hinge means associated with each lever and pivotally securing one said arm of the associated lever to said pressure plate; and (c) second hinge means associated with each lever and pivotally securing the other said arm of the associated lever to said clutch cover.

2. In a clutch as set forth in claim 1, friction means frictionally impeding translatory movement of each of said middle portions relative to said intermediate plate in the direction of said common axis while permitting shifting of said middle portions under a sufficient force applied in said direction.

3. In a clutch as set forth in claim 2, a pivot member interposed between each of said spaced apart portions of said intermediate plate and the corresponding said middle portion, said pivot member forming the pivot axis, said middle portion being mounted on said pivot member for angular movement about the corresponding pivot axis, said friction means frictionally impeding translatory movement of said pivot member to one of said corresponding portions.

4. In a clutch as set forth in claim 3, said one corresponding portion being a circumferential portion of said intermediate plate.

5. In a clutch as set forth in claim 3, said one corresponding portion being said middle portion.

6. In a clutch as set forth in claim 3, said one corresponding portion being formed with a bore receiving said pivot member and dimensioned for permitting movement of said pivot member in said bore in the direction of said common axis, said friction means including two annular friction members on said pivot member receiving said corresponding portion therebetween, and yieldably resilient means on said pivot member biasing said friction members against said corresponding portion.

7. In a clutch as set forth in claim 6, said pivot member having an enlarged portion, said yieldably resilient means including a stack of belleville washers interposed between said enlarged portion and one of said friction members.

8. In a clutch as set forth in claim 1, said clutch cover including a ring portion axially coextensive with said intermediate plate and formed with a readily open passage for each of said levers with said open passage being radially aligned with said common axis.

9. In a clutch as set forth in claim 8, said hinge means including a first pin fixedly mounted on said pressure plate and a second pin fixedly mounted on said clutch cover, each of said arms of each said lever being formed with a groove elongated radially relative to the associated pivot axis and each said groove receiving a different one of said first and second pins for longitudinal movement therein.

* * * * *